United States Patent
Rosas Gajardo et al.

(10) Patent No.: US 10,173,938 B2
(45) Date of Patent: Jan. 8, 2019

(54) PROCESS FOR PRODUCING A BIOFERTILIZER COMPRISING THE STEPS OF SOLID-STATE FERMENTATION, IMMOBILIZATION THROUGH ALLOPHANE NANOPARTICLES AND A SECOND FERMENTATION; AND THE SAID BIOFERTILIZER

(71) Applicants: UNIVERSIDAD DE CONCEPCION, Concepcion (CL); UNIVERSIDAD DE TALCA, Concepcion (CL)

(72) Inventors: Anali Estela Rosas Gajardo, Concepcion (CL); Roxana Sofia Lopez Emparan, Concepcion (CL)

(73) Assignees: UNIVERSIDAD DE CONCEPCION, Concepcion (CL); UNIVERSIDAD DE TALCA, Concepcion (CL)

( * ) Notice: Subject to any disclaimer, the term of this patent is extended or adjusted under 35 U.S.C. 154(b) by 139 days.

(21) Appl. No.: 15/109,204

(22) PCT Filed: Dec. 24, 2014

(86) PCT No.: PCT/CL2014/000087
§ 371 (c)(1),
(2) Date: Jun. 30, 2016

(87) PCT Pub. No.: WO2015/100513
PCT Pub. Date: Jul. 9, 2015

(65) Prior Publication Data
US 2016/0326068 A1   Nov. 10, 2016

(30) Foreign Application Priority Data
Dec. 30, 2013   (CL) .................................. 3780-2013

(51) Int. Cl.
*C05F 3/00*   (2006.01)
*C05F 17/00*   (2006.01)
(Continued)

(52) U.S. Cl.
CPC .......... *C05F 17/0045* (2013.01); *C05B 17/00* (2013.01); *C05F 3/00* (2013.01);
(Continued)

(58) Field of Classification Search
CPC .... C05F 17/0045; C05F 3/06; C05F 17/0258; C05F 3/00; C05F 17/0027; C05F 17/0063;
(Continued)

(56) References Cited

U.S. PATENT DOCUMENTS

2004/0194376 A1   10/2004   Baumann
2011/0045976 A1   2/2011    Villaverde Fernandez et al.

OTHER PUBLICATIONS

M. Calabi-Floody, et al; Improving bioavailability of phosphorous from cattle dung by using phosphatase immobilized . . . ; Chemosphere 89; 2012; pp. 648-655 (not enclosed).
(Continued)

*Primary Examiner* — Jennifer A Smith
(74) *Attorney, Agent, or Firm* — Lucas & Mercanti, LLP

(57) ABSTRACT

Process for producing a biofertilizer, comprising the following steps: a) solid-state fermentation to produce enzymes and nutrients critical for plant nutrition; b) immobilization through allophane nanoparticles of the enzymes and substrates produced during stage a); and c) a second fermentation to favor the development of microorganisms that improve the quality of the biofertilizer. Protection is also sought for the biofertilizer that is produced from this process.

6 Claims, 8 Drawing Sheets

Figure 1:
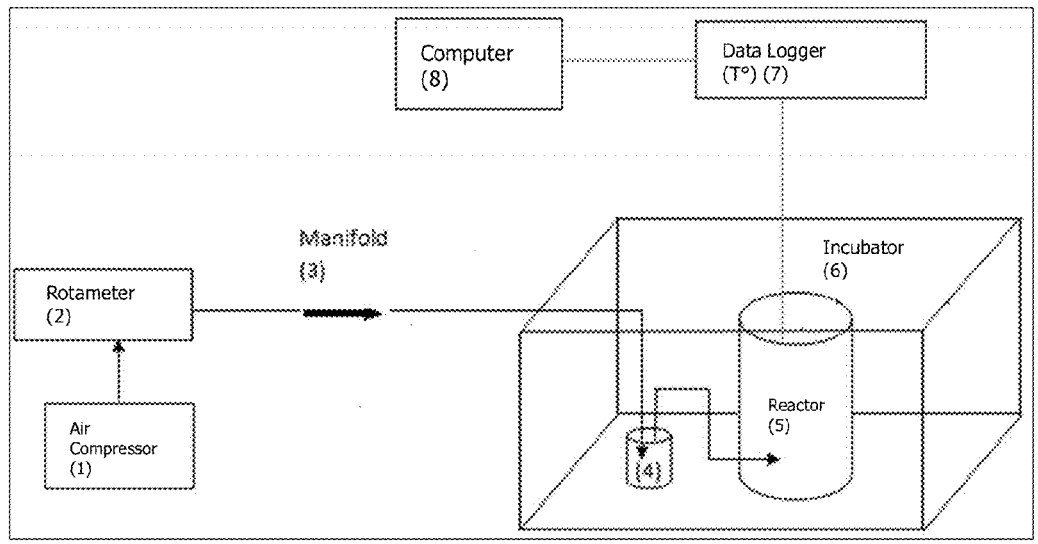

(51) Int. Cl.
    *C05B 17/00*     (2006.01)
    *C05F 3/06*     (2006.01)
    *C05F 17/02*     (2006.01)
    *C05G 3/00*     (2006.01)

(52) U.S. Cl.
    CPC ............ *C05F 3/06* (2013.01); *C05F 17/0027* (2013.01); *C05F 17/0036* (2013.01); *C05F 17/0063* (2013.01); *C05F 17/0258* (2013.01); *C05G 3/0041* (2013.01); *Y02A 40/205* (2018.01); *Y02A 40/208* (2018.01); *Y02P 20/145* (2015.11); *Y02W 30/43* (2015.05)

(58) Field of Classification Search
    CPC ... C05F 17/0036; C05G 3/0041; C05B 17/00; Y02A 40/208; Y02A 40/205; Y02W 30/43; Y02P 20/145
    See application file for complete search history.

(56) References Cited

OTHER PUBLICATIONS

D. Menezes Blackburn, et al; A novel phosphorus biofertilization strategy using cattle manure treated with . . . ; Biol. Fertil. Soils; vol. 50; 2014; pp. 583-592 (not enclosed).
L. Chen, et al; Solid-state fermentation of agro-industrial wastes to produce bioorganic fertilizer for the biocontrol . . . ; Bioresource Technology; vol. 102; 2011; pp. 3900-3910 (not enclosed).
International Search Report dated Apr. 10, 2015 for PCT/CL2014/000087.

PROCESS FOR PRODUCING A BIOFERTILIZER COMPRISING THE STEPS OF SOLID-STATE FERMENTATION, IMMOBILIZATION THROUGH ALLOPHANE NANOPARTICLES AND A SECOND FERMENTATION; AND THE SAID BIOFERTILIZER

CROSS REFERENCE TO RELATED APPLICATION

This Application is a 371 of PCT/CL2014/000087 filed on Dec. 24, 2014, which claims priority of Chilean Patent Application No. 3780-2013 filed Dec. 30, 2013, each of which are incorporated herein by reference.

FIELD OF THE INVENTION

This technology is oriented towards the agriculture and livestock industry, mainly the former, and is designed to improve agricultural soils, enabling an increase in the availability of nutrients when required by plants.

STATE OF THE ART

The need to produce food products extremely quickly and in large quantities has led to a departure from traditional agricultural methods in order to obtain higher crop yields. These high yields, however, are made possible through the use of fertilizers that require great quantities of energy, mainly from fossil fuels. In addition, the disproportionate use of chemical fertilizers is one of the main causes of soil degradation. It is thus necessary to increase the application of more innocuous fertilizers to replace chemical fertilizers or at least reduce their excessive use.

The most widely used fertilizers worldwide are mineral products containing mainly nitrogen (N), phosphorus (P) and potassium (K). These products are considered indispensable for providing the amount of nutrients necessary for optimal crop yields. Nonetheless, many factors associated with the use of chemically-synthesized fertilizers are currently the subject of intense debate. These include: 1) the reduction of global reserves of phosphate rock; 2) environmental pollution caused by the chemical synthesis of nitrogen and phosphorus fertilizers; 3) environmental pollution caused by the application of fertilizers to soils; and 4) the inefficiency of fertilizer use.

Calculations regarding the remaining reserves of phosphate rock, the most important mineral used to synthesize phosphorus fertilizers, have varied in recent years (Van Vuuren et al., 2010). This is due to the large number of factors affecting the availability of this resource and their unpredictability. Relevant factors include the demand for phosphorus fertilizers, the diverse technical methods for quantitatively estimating phosphate rock reserves, new agricultural policies, the economic crisis, geopolitical instability and market distortions (Cordell et al., 2011). An example of such a market distortion was the global food crisis of 2008, during which the price of phosphate rock commodities increased by 800% over a period of 18 months. In addition, most studies on phosphate rock reserves are based on estimates carried out by each country and reports from scientific and industrial assessments using a variety of technical methods (Jasinski, 2010). According to many authors, a defining moment in the availability of phosphorus fertilizers will be what is known as the phosphate rock production peak (Dery & Anderson, 2007; Cordell et al., 2009; Cordell et al., 2011a), defined as the moment in which the maximum quantity of high-quality phosphate rock is produced at a low price. After this point has been reached, the production of phosphate rock will diminish irrespective of the growing market demand, mainly due to economic and energy limitations (Cordell et al., 2011a). Different studies regarding the phosphate rock production peak generally predict this moment occurring within the next 20 to 70 years (Cordell et al., 2009; Van Kauwenbergh, 2010; Lindström et al.; Cordell & White 2011). This high degree of vulnerability of the global phosphate rock market makes it necessary to diversify sources of P by investing in renewable phosphorus fertilizers and/or recuperating all sources of P present in the food chain more efficiently.

At a global level, it is widely recognized that the production of fertilizers requires large amounts of energy and is a significant source of greenhouse gases. It has been estimated that fertilizer production consumes 1.2% of all global energy and causes around 1.2% of greenhouse gas emissions (Kongshaugh, 1988). In the case of nitrogen fertilizers, the main greenhouse gases emitted are $CO_2$, generated through the combustion of natural gas for ammonia synthesis, and nitrous oxide, released during the production of nitric acid. The production of phosphorus fertilizers is also responsible for the emission of large quantities of $CO_2$ due to the use of fossil fuels throughout the production process (Wood & Cowie, 2004).

Nitrogen and potassium fertilizers generally contain low concentrations of As, Cd and Pb, and therefore do not contribute significantly to the accumulation of toxic elements in soils and crops (Raven & Loeppert, 1997; Luo et al., 2009). Phosphorus fertilizers, however, can contain a high concentration of heavy metals (As), depending on the type and source of the mineral from which the phosphorus is extracted (Jiao et al., 2012; Chaney, 2012). In general terms, sedimentary phosphate rock contains a greater concentration of impurities, including toxic elements, than igneous phosphate rock (Hartley et al., 2012). Unfortunately, no economically feasible processes for removing the contaminants present in phosphate rock have been developed to date (Stacey, 2010). Although studies measuring the concentration of arsenic in more than 300 samples of phosphorus fertilizers of various origins obtained relatively low arsenic concentrations, with an average of between 7.6 mg $kg^{-1}$ and 20 mg $kg^{-1}$ of As in over 90% of the samples (Nziguheba & Smolders, 2008; Jiao et al., 2012), the reduction in sources of high quality phosphate rock makes it highly likely that there will be a tendency to increase the use of phosphate rocks from sources with a high concentration of heavy metals (Stacey et al., 2010). It has been proven that the long-term use of phosphorus fertilizers with a high concentration of As considerably raises the concentration in soils of As, a highly persistent element that is absorbed by plants (Hartley et al., 2013). Being absorbed by plants allows it to reach the human food chain and create a high risk to human health. This could occur, for example, with the accumulation of As in rice grown in flooded conditions (Meharg et al., 2009; Meharg & Zhao, 2012). Other toxic elements contained in phosphorus fertilizers, such as cadmium (Cd) and lead (Pb) are present in more variable concentrations than As (Jiao et al., 2012). In an assessment of 277 fertilizer samples, 16% contained a concentration higher than 100 mg $kg^{-1}$ of Cd, with a similar tendency for Pb (Jiao et al., 2012).

On the other hand, it has been observed that micronutrient fertilizers have a greater concentration of toxic elements such as Cd and Pb than phosphorus fertilizers and NPK products (CDFA, 1998; EPA US 1999).

Eutrophication, both natural and anthropogenic, consists of an accumulation of nutrients in surface waters, stimulating the growth of aquatic flora. In general, the nutrient that most contributes to algae growth in this case is P, as some algae species such as blue-green algae can biologically fixate atmospheric N (Chien et al., 2011). The main source of P for water eutrophication is agriculture (EPA, 2009), due to the surface runoff of P dissolved in water (Preedy et al., 2001). In this regard, many studies have observed a greater runoff of P from phosphorus fertilizers compared to animal slurry (Bundy et al., 2001; Preedy et al., 2001; Tabara, 2003).

The maximum efficiency of nitrogen, phosphorous and potassium fertilizers applied directly to soils is around 55%, 35% and 60%, respectively. Thus, the total global loss of N, for example, can reach 9.45 million t each year. In order to increase the efficiency of fertilizers, products such as slow-release and controlled-release fertilizers, as well as urease and nitrification inhibitors have been developed (Xiang et al., 2008). However, these technologies are only aimed at reducing nutrient loss, instead of enabling the liberation of nutrients according to plant requirements at each phenological stage.

In soils, the fraction of organic nutrients is greater than that of inorganic nutrients. Inorganic N, for example, is one of the most unstable elements in soils due to a series of processes causing its loss, such as: the leaching of $NO_3^-$; biological denitrification leading to losses of N in the form of $N_2$ and $N_2O$; chemical denitrification where N is lost in the form of $NO_x$, $N_2O_x$ and $N_2$; volatilization causing the loss of N in the form of $NH_3$; and soil erosion leading to the loss of N in the form of $NH_4^+$ and organic N. Due to these losses, it is not possible for N to accumulate in soils in an inorganic form. On the other hand, N accumulates naturally in soils in its organic forms in organic and/or composted matter. The amino acids asparagine and glutamine, for example, are two of the most abundant forms of organic N in soils. In fact, some studies have shown that the percentage of $NH_4^+$ liberated during asparagine and glutamine hydrolysis was equal to the sum of these substrates present in humic acids (Bremner, 1955; Sowden, 1958). The mineralization of these amino acids is catalyzed by the enzymes L-asparaginase and L-glutaminase. Thus, both enzymes fulfill an important role for the mineralization of N in soils and its subsequent availability for plants (Hojjati & Nourbakhsh, 2007; Nourbakhsh & Alinejadian, 2009).

As with N, organic sulfur (S) in soils comprises approximately 98% to 99% of the total sulfur content (Tabatabai, 1982). Of the total organic S [(500 to 1500 mg S $Kg^{-1}$ soil)] contained in the soil profile and organic residues, the form ester sulfate (R—O—$SO_3H$) corresponds to 30% to 75% (Aguilera et al., 2002). Ester sulfate is considered the most labile form of sulfur in soils and is therefore the form most directly related to plant nutrition (Maynard et al., 1985; Eriksen et al., 1998). Among the enzymes related to the transformation of sulfur from inorganic polymers, arylsulfatase enzymes are considered key to the mineralization of ester sulfate, and are therefore responsible for the mobilization of sulfur from organic matter or organic substrates such as compost (Klose & Tabatabai, 1999).

In most soils, organic phosphorus (P) makes up between 20% and 80% of total P. It therefore constitutes an important potential reserve (Fransson and Jones 2007). Most organic P consists of the forms monoester and phosphate diester (Borie & Rubio, 2003; Briceño et al., 2005; Turner 2008). Both organic forms of P are mineralized by acid and alkaline phosphatase enzymes. The resulting end product is phosphate, which can be rapidly absorbed by plants (Sanyal & DeDatta, 1991). Phosphatases are very sensitive to phosphorus deficiencies in soil, so that there is a sharp increase in phosphatase when the amount of P in the soil solution decreases (Sedenko & Zaitseva, 1984; Smith & Chevalier, 1984).

Studies on the addition of enzymes to soils in order to accelerate mineralization processes are not new. One of the first studies carried out by Neumann et al. (1999) showed that adding the enzyme acid phosphatase to soils in order to accelerate the mineralization of organic P led to a low liberation of P from the organic fraction, as the activity of the enzyme was significantly reduced due to denaturation. Thus, the strategy of using enzymes for accelerated mineralization can only be effective if the enzyme is active and immobilized in a support. In fact, it has been shown that any enzyme added to soils is naturally retained or immobilized in the first 3 min after coming into contact with the different soil fractions, although this does not ensure that the enzyme is active. In this regard, studies have been carried out on the artificial immobilization of acid phosphatase and arylsulfatase using supports such as humic substances, 2:1 clays, and Al and Mn oxides. In these cases, enzymatic activity decreased because certain supports acted as enzymatic inhibitors or lost protein during the artificial immobilization process of the enzymes (Rao & Gianfreda, 2000; Kelleher et al., 2004; Whalen & Warman, 1996b). Therefore, in order to control the mineralization of organic substrates using enzymes, it is necessary to choose supports that can retain a high concentration of protein and that do not inhibit the enzyme's activity. According to the results obtained by Rosas et al. (2008) and López and Rosas (2008), the immobilization of the acid phosphatase in clay minerals from an Andisol increased the specific activity of the enzyme by 89% to 144%. Furthermore, the immobilization process using this support did not lead to a loss of protein, a common phenomenon when using other types of supports, whether organic or inorganic (Rao & Gianfreda, 2000). In this regard, Pant and Warman (2000), who studied the mineralization of P by acid phosphatase, determined that the addition of immobilized phosphatase to soils increased the available phosphorus (extracted with water and NaOH) by 49%. López and Rosas (2008) reported an increase in available P (Olsen P) of up to 150% with acid phosphatase immobilized in Andisol clays and very low levels of enzymatic protein.

Most farmers recognize the importance of adding compost to soils due to its nutrients and effects on the physical properties of soils. Yet the availability of nutrients from compost is dependent on mineralization processes. Thus, as with mineral fertilizers, the liberation of nutrients from compost does not coincide with plant absorption. The mineralization of organic matter in soils is carried out by enzymes of the N, P and S cycles. However, soil degradation and the use of plant species less adapted than native flora have led to a successive loss of enzymatic activity in soils. The use of immobilized enzymes could be a more efficient and environmentally friendly way of producing nutrients for agricultural production.

The study of enzymatic immobilization in silica nanoparticles has advanced significantly in recent years, as immobilization in these supports increases enzyme activity and catalytic efficiency (Gill, 2001; Reetz et al., 2003; Shchipunov et al., 2004). Wei et al. (2001) immobilized an acid phosphatase in silica nanopores. In this support, the enzyme's activity and catalytic efficiency increased because the size of the pores and the surface area of the support facilitated the transport of the substrate and the product. Luckarift et al. (2004) showed that enzymes immobilized in a silica matrix presented a high degree of thermal stability and no proteolytic degradation after 30 days at room temperature in the absence of antibiotics. The particle and pore size and structure of these silica nanomaterials are similar to those of allophane microaggregates. Allophane is the main constituent of the clay minerals of Andisols. This clay is characterized by a surface area varying between 700 m2/g and 1100 m2/g and an approximate size of 35 Å to 55 Å (Parfitt, 1990). Allophane is considered a natural nanoparticle due to its size, large surface area, pore size and structural stability (nanoclay).

The addition of immobilized enzymes offers clear advantages compared to traditional fertilization, including the following: 1) traditional P fertilization leads to a high initial availability of P, one of the main causes of water eutrophication; 2) the enzyme is activated under conditions of low nutrient availability, generated by natural plant absorption, and is inactivated when availability reaches medium levels (15 mg kg-1 to 20 mg kg-1; López & Rosas, 2008); 3) the immobilized enzyme can remain active for long periods of time and contribute to the natural availability of nutrients for more than one crop cycle.

Composting is a bio-oxidative process (Albrecht et al. 2010) in which different types of organic waste (straw, peelings, bark, agricultural and livestock byproducts, manure, etc.) undergo decomposition and humification and are modified through a wide range of biological and biochemical processes (Tiquia et al., 2001). This transformation leads to a relatively stable product containing a large amount of humic substances and free of phytotoxic substances and pathogens (Zucconi & De Bertoldi, 1987; Claassen & Carey, 2004). The role of enzymes in these transformations is crucial (Tiquia et al., 2001; Tiquia et al. 2002), as they provide easily available nutrients to the different microorganisms during each composting stage. Among these enzymes are those that could have important agricultural applications, such as phosphatases, arylsulfatases and N-cycle enzymes.

As stated by Gautam et al. (2010), composting is a process that makes it possible to recycle organic waste and produce organic matter that can be applied to soils, thereby reducing the environmental impact of the said waste. Vuorinen (2000), Mondini et al. (2004) and Fuentes (2009) observed in their studies acid and alkaline phosphatase activity levels higher than those of agricultural soils and even than those measured in an Andisol in a pristine forest ecosystem in the south of Chile.

Godden et al. (1983), Vuorinen (2000) and Fuentes (2009) observed that phosphatase activity increased during the first days of composting bovine manure and remained constant during the thermophilic stage. Regarding the period of greatest phosphatase activity, Albrecht et al. (2010), who carried out a composting of green waste and sewage sludge, state that phosphatase activity is cyclical in nature, with the acid phosphatase peak being reached first and subsequently that of alkaline phosphatase. Therefore, the production of enzymes depends on each stage of the composting process.

Solid-state fermentation (SSF) is a technique based on composting in which fermentation occurs in the absence of free-flowing water and natural or synthetic solid substrates are used as a support for microbial growth (Pandey et al., 2009). This technique makes it possible to create ideal conditions for the production of specific biomolecules while maintaining the advantages of the original composting process, such as: low energy requirements, the use of low-cost fermentable substrates which also provide sources of carbon, nitrogen and macro and micro elements necessary for microorganism growth (Petruccioli et al. 2011), and the elimination of solid waste (Pandey, 2000). In fact, the industrial use of SSF in enzyme production is becoming more and more widespread every day (Rodriguez & Sanromán, 2005).

During SSF, one of the key factors for enzymatic activity is temperature. In fact, enzymatic activity has been described as being dependent on temperature during the composting process (Mondini et al., 2004). The moisture level also seems to be of significance during SSF. According to Manpreet et al. (2005), the adequate moisture range for this type of fermentation fluctuates between 40% and 80%. Thus, in order to optimize enzyme production during fermentation it is necessary to control both temperature and moisture.

Based on the acid phosphatase activity levels observed in Andisols in natural ecosystems, such as forests in the south of Chile, with values reaching 1 IU $g^{-1}$ of dry soil (Redel et al. 2008) and levels reported for the composting process of 0.3 IU $g^{-1}$ to 3.4 IU $g^{-1}$ (Vuorinen, 2000; Tiquia et al., 2001; Pandey, 2003), it is possible to infer that bovine manure could be used as a raw material for producing enzymes and that maximum levels of phosphatase activity could be reached using SSF with bovine manure, in a manner based on the composting process, and at a temperature of 35° C. (corresponding to the mesophilic/thermophilic stage).

DESCRIPTION OF THE INVENTION

The invention consists of a process for producing a biofertilizer based on enzymes immobilized in a nanomaterial, making it possible to increase the availability of nutrients when required by plants.

The first stage of the said process consists of a solid-state fermentation under conditions necessary for producing certain key enzymes for plant nutrition. Also produced during this fermentation are the substrates necessary for enzymes to catalyze the mineralization reactions necessary for providing plants with sufficient P, N, S and other elements. During the second stage of the process, the nanomaterial allophane is added to the fermentation product. This nanomaterial consists of Si and Al nanoparticles that form aggregates in which the enzymes produced during the SSF are immobilized, protecting them from microbial degradation and increasing their catalytic efficiency. The third stage consists of a second fermentation under conditions necessary for reducing the number of pathogenic microorganisms that may have survived the first stage, thus improving the quality of the fermentation product. The result of these processes is a fermentation product that has been enriched with enzymes, organic substrates, plant growth hormones, and micro and macro mineral nutrients necessary for plant growth.

In the first stage, agricultural, livestock and agro-industrial waste is subjected to solid-state fermentation in either reactors or piles. Fermentation parameters are a temperature between 25° C. and 70° C. and moisture levels between 55% and 80%. This stage lasts between 12 and 18 days in reactors and 5 and 10 weeks in piles and promotes the production of enzymes such as phosphatases, sulfatases, asparaginases and glutaminases, in addition to organic substrates and beneficial microorganisms. The fact that pathogenic microorganisms—especially those associated with gastrointestinal diseases, such as *E. coli* and *Salmonella* sp.—also multiply in this stage makes it necessary to carry out a second SSF during the final stage of the process.

The duration of the SSF phase depends on whether fermentation is carried out in reactors or piles. In reactors, it is possible to observe a cyclical pattern where activity rises and decreases over a prolonged period, making a shorter fermentation necessary. On the other hand, the activity in piles after three months of SSF—where temperatures of 70° C. are reached—is similar to the first peaks obtained from the reactors.

At the end of the first stage the nanoparticles are added. These consist of allophane at a percentage of between 10% and 40% weight/weight (dry fermented matter vs. dry allophane matter). This stage enables the encapsulation of the enzymes and part of the previously generated substrates. A key aim in the creation of a biofertilizer is for it to be an efficient bio-catalyzer, for which it is important to immobilize the enzymes it contains. In this regard, these nanoparticles have an ideal surface area/volume ratio for serving as an enzymatic carrier. Allophane is a nanoparticle or nanoclay that allows a very high degree of enzymatic immobilization. It consists of spherules with a diameter of 3 nm to 8 nm that form porous aggregates, allowing for interaction with the organic matter and the physical protection of the enzymes in the said matter.

During the third stage, a second and more prolonged SSF is carried out for 30 to 60 days at a temperature between 15° C. and 50° C. and with moisture levels between 60% and 85%. These conditions favor the development of processes that produce metabolites that control and eliminate pathogenic bacteria.

The final product of this process is a biofertilizer containing:
 a) encapsulated enzymes, mainly phosphatases, sulfatases, asparaginases and glutaminases;
 b) organic substrates containing P, N and S;
 c) organic compounds beneficial for plant growth, such as hormones, fulvic acids and humic acids;
 d) micro-organisms beneficial for plant development.

The biofertilizer has a concentration of organic matter of 55% to 70%, of allophane of 10% to 40%, and a concentration of encapsulated enzymes in the allophane of: 1.09 IU $g^{-1}$ to 4.4 IU $g^{-1}$ for alkaline phosphatase; 0.2 IU $g^{-1}$ to 1.2 IU $g^{-1}$ for acid phosphatase; 0.05 IU $g^{-1}$ to 0.10 IU $g^{-1}$ for arylsulfatase; 0.6 IU $g^{-1}$ to 1.05 IU $g^{-1}$ for L-asparaginase; and 3.0 IU $g^{-1}$ to 4.6 IU $g^{-1}$ for L-glutaminase.

This biofertilizer contains a pool of nutrients stored organically that will be liberated through enzymatic action during plant development depending on the concentration of nutrients in the soil. These nutrients are presented in Table 1.

TABLE 1

Nutrients available in the biofertilizer.

| | |
|---|---|
| Organic matter | 64.37% |
| Nitrates (N—NO$_3$) | 55.80 mg/kg |
| Ammonium (N—NH$_4$) | 404.70 mg/kg |
| Available nitrogen | 460.40 mg/kg |
| Phosphorus (P) | 0.78% |
| Potassium (K) | 1.20% |
| Calcium (Ca) | 3.08% |
| Magnesium (Mg) | 0.30% |
| Iron (Fe) | 5600 ppm |
| Manganese (Mn) | 580 ppm |
| Zinc (Zn) | 360 ppm |
| Copper (Cu) | 80 ppm |
| Boron (B) | 62.27 mg/kg |
| Total N | 3.08% |
| Na | 0.51% |

The effectiveness of this biofertilizer is equal to or greater than that of chemical fertilizers but with a higher degree of efficiency and sustainability, as it enables the reutilization of waste and avoids unnecessary nutrient loss into the environment, due to the fact that only the nutrients necessary for the plant are released according to its requirements over time.

Unlike compost that mainly adds organic substrates and fulvic and humic substances to soils, the biofertilizer also adds enzymes, enabling it to release nutrients from the organic substrates in sufficient quantities for plant development. In the first stage of the biofertilizer production process, i.e. the fermentation stage for producing enzymes, it is possible to produce large amounts of the said enzymes (Table 2), whereas no significant quantities of these enzymes have been detected in commercial compost products.

TABLE 2

Amount of enzymes produced during fermentation.

| | Enzyme production in IU/t of dry fermented matter |
|---|---|
| Arylsulfatase | 100000 |
| Acid phosphatase | 600000 |
| Alkaline phosphatase | 4000000 |
| L-asparaginase | 800000 |
| L-glutaminase | 2000000 |

In summary, this new biofertilizer has in one formulation the advantages of both controlled-release mineral fertilizers, providing the plant with available nutrients gradually over time, and of compost, adding organic substrates, humic substances and beneficial microorganisms to soils.

APPLICATION EXAMPLES

Example 1: Biofertilizer Production Process

The manure used for the SSF trials was collected from calf fattening stalls at the Agrícola Pullami farm in Coihueco in the Chilean Bío Bío Region.

The process comprises three stages, which are described below:

I. Solid-State Fermentation of Manure for Enzyme Production.

Enzymatic activity was evaluated under different temperature and moisture conditions during the solid-state fermentation of bovine manure in order to optimize the enzyme production process.

The effect of temperature on enzymatic activity during the solid-state fermentation of bovine manure was assessed at 25° C., 35° C. and 55° C.

The reactors for the solid-state fermentation process were designed by adapting the system proposed by Grewal et al. (2006). This system makes it possible to control temperature and moisture conditions. The first trial was carried out at a temperature of 25° C. and with undried manure, i.e. with a moisture level of over 80%. For the second trial the temperature was 35% and the moisture was 60%, and for the third trial the temperature was 55° C. and the moisture was 60%.

FIG. 1 shows the equipment used for the fermentation process. A reactor (5) was placed in an incubator (6), where the said reactor consisted of a cylindrical PVC tube 16 cm in diameter and 30 cm long with an approximate capacity of 4 L. The base of the cylinder was covered with a metal wire mesh with 1×1 mm holes in order to homogenize the incoming airflow. The mesh wire was supported on an acrylic disk. In order to ensure aerobic fermentation, the reactors were connected to an air line (3) provided by an external aeration system fed by a 2 HP compressor (1). The air fed into the reactor was treated, first with a vapor trap and subsequently with an air filter aimed at minimizing the oil content from the compressor motor. This ensured that the air was free of particles that could have affected the biological process and/or the measurement of enzymatic activity. A rotometer (2) regulated the airflow, which was adjusted to 100 ml/min. The air line was connected through a tube to a glass jar with distilled water (4), in which bubbling occurred in order to maintain stable moisture conditions in the bioreactors. In order to measure the temperature, a Data Logger (7) was used that functioned as a scanner with temperature sensor inputs (thermocouples) connected to a computer (8).

Every seven days the manure in each reactor was turned. This consisted in mixing the manure in order to homogenize it. After each turning, a 50 g sample was taken from each reactor. These samples were used to determine physical, chemical and biochemical parameters.

For the first fermentation trial, fresh manure from the animal fattening farm was used exactly as it was received, with 80% moisture, and fermented at 25° C. to simulate ambient temperature during spring, with three repetitions.

For the second SSF trial, the bovine manure was treated to lower the moisture level to 60% and the effects of temperature on enzymatic activity were assessed. The temperatures used for the trial were 35° C. and 55° C., which correspond to the average temperatures reached during the mesophilic and thermophilic stages, respectively, of the compost process. Enzymatic activity was measured until repetitive behavior over time was observed, with cycles of increasing and decreasing activity. This trial was carried out over a period of 10 weeks.

Acid and Alkaline Phosphatase Activity:

Enzymatic activity was determined using a method adapted from the one proposed by Vuorinen (1993, 2000), consisting in weighing 0.25 g of sample and mixing it with 1.25 mL of 62.3 mM 4-nitrophenyl phosphate in an MUB solution pH 5.0 to determine acid phosphatase activity and pH 9.0 to determine alkaline phosphatase activity. The enzyme with the substrate was then incubated at 30° C. for 30 min. The mixture was then rapidly cooled in an ice bath and 3 mL of ice cold diethyl ether were added. The mixture was shaken for 60 min in a shaker refrigerated at 4° C. After shaking, 0.5 mL of the resulting solution were extracted and, for acid phosphatase, added to 40.5 mL of 0.5 M NaOH solution in a 10 mL volumetric flask. For alkaline phosphatase, 1 mL of the solution already containing 4.5 mL of 0.5 M NaOH solution were dissolved in 2 mL of distilled water and shaken vigorously. Absorbance at 420 nm was then measured for the previously obtained extract using a spectrophotometer. A calibration curve was carried out to calculate the concentration of the product (p-nitrophenol) in the sample. Activity was expressed as IU $g^{-1}$ of dry fermentation product (international units in function of the dry fermented matter).

Figure 2:
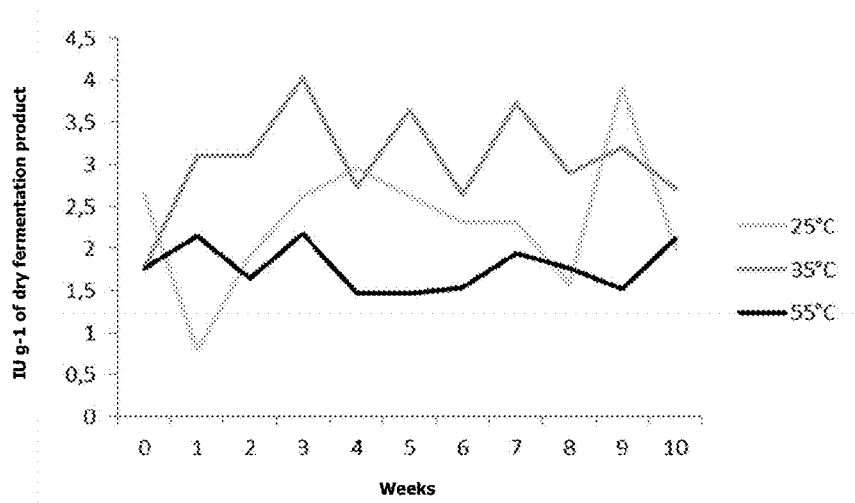
Figure 3:
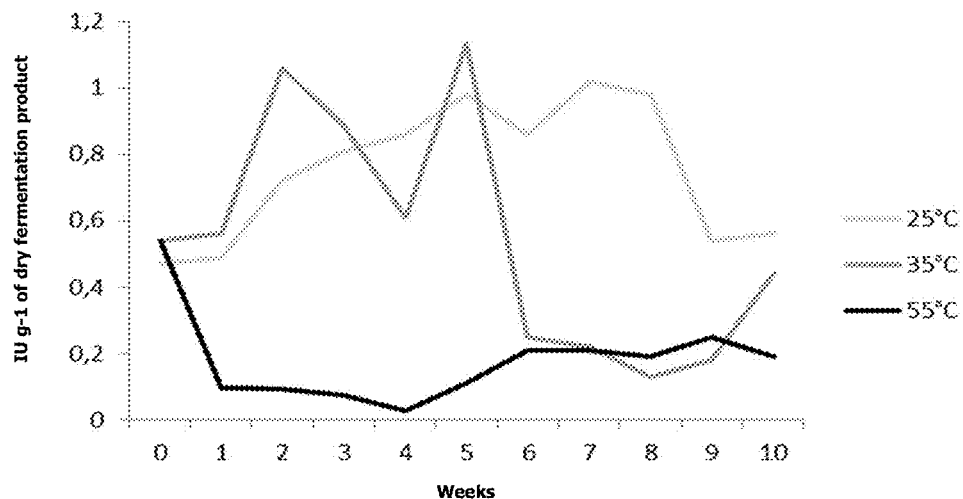

The activity curves of both enzymes at different reactor temperatures are shown in FIG. 2 for alkaline phosphatase and FIG. 3 for acid phosphatase.

In the SSF at 25° C. and 80% moisture, the highest alkaline phosphatase activity levels were reached in week 9 of the trial, with a value of 3.40 IU $g^{-1}$ of dry fermented matter, followed by week 4 with a value of 3.36 IU $g^{-1}$ of dry fermented matter, as seen in FIG. 2. The highest acid phosphatase levels were reached during week 7 of the trial, with a value of 1.02 IU $g^{-1}$ of dry fermented matter, followed by 0.98 IU $g^{-1}$ of dry fermented matter in week 5 and 0.93 IU $g^{-1}$ of dry fermented matter in week 6, as seen in FIG. 3.

For alkaline phosphatase, the values obtained in the trial at 25° C. and 80% moisture were higher than those expected, considering that in similar studies the highest enzymatic activity of hydrolase enzymes has been associated with higher temperatures that are reached naturally during the composting process (Vuorinen, 2000; Mondini et al., 2004). Regarding acid phosphatase, as with results obtained for alkaline phosphatase, a cyclical behavior for the enzymatic activity during SSF was observed, with high values of acid phosphatase activity in weeks 7, 5 and 6.

In the SSF carried out with 60% moisture, the evolution over time of the mixtures at 35° C. and 55° C. was characterized by a marked increase in alkaline phosphatase activity in week 3 of the trial, with values of 4.39 IU $g^{-1}$ of dry fermented matter and 2.44 IU $g^{-1}$ of dry fermented matter, respectively. Acid phosphatase activity increased in weeks 5 and 9 of the trial, with values of 1.22 IU $g^{-1}$ of dry fermented matter at 35° C. and 0.24 IU $g^{-1}$ of dry fermented matter at 55° C. In both cases, the values obtained at 55° C. were lower.

Arylsulfatase Activity:

The methodology for determining enzymatic activity described by Gonzalez et al. (2003) and Fornasier et al. (2002) was adapted, the hydrolytic action of the enzyme being applied to an artificial substrate (p-nitrophenyl sulfate, pNPS) in order to detect the product (p-nitrophenol, pNP) using spectrophotometry at 420 nm. The amount of enzymatic activity was thus proportional to the concentration of pNP in the medium after hydrolysis. 0.25 g of fermented matter were weighed and 5 mL of acetate buffer pH 5.7 and 1.25 mL of 5 mM pNPS in a buffer solution were added, and the mixture was incubated for 1 h at 37° C. After incubation, the mixture was cooled at 4° C. and 3 mL of diethyl ether were added. The mixture was then shaken at 200 RPM for 1 h, and 0.5 mL of the supernatant were taken with 2.5 mL of 1 M NaOH and absorbance was determined at 420 nm. Enzymatic activity in the sample was quantified through comparison with a curve based on the reference solution (fermented matter without substrate).

Figure 4:
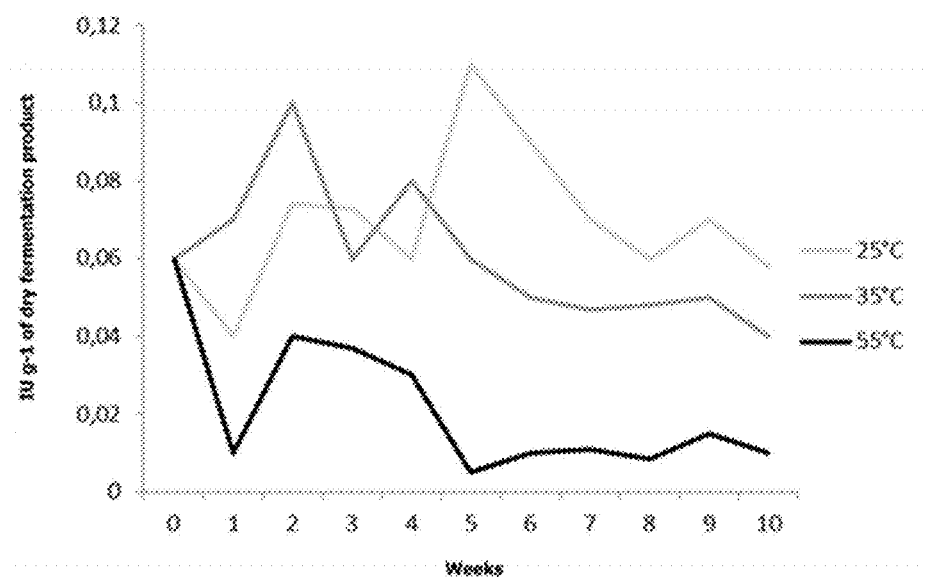

As shown in FIG. 4, a high level of arylsulfatase activity was recorded in week 5 of the trial at 25° C. and 80% moisture, with a value of 0.1094 IU $g^{-1}$ of dry fermented matter, whereas the lowest level of activity for this trial was recorded in week 1, with a value of 0.0569 IU $g^{-1}$ of dry fermented matter. The highest level of arylsulfatase activity for the trial with 60% moisture and a temperature of 35° C. was reached in week 2, with a value of 0.1038 IU $g^{-1}$ of dry fermented matter, whereas the lowest level of activity was observed in week 5 with a value of 0.0058 IU $g^{-1}$ of dry fermented matter at a temperature of 55° C.

Studies on arylsulfatase activity are especially rare with regard to composting and fermentation processes (Cayuela et al. 2008). Tejeda et al. (2009) detected a maximum arylsulfatase activity level of 0.0078 IU/g during week 2 of the composting process with temperatures close to those of the mesophilic stage and 52.8% moisture, the said value being much lower than those obtained in the present study. Similarly, in a composting study with waste from olive oil mills, Cayuela et al. (2007) describe a maximum arylsulfatase activity level of 0.0156 IU/g after 34 weeks, at the end of a composting process with 40%-60% moisture. Mondini et al. (2004), observed maximum arylsulfatase activity levels of 0.0335 IU/g after 85 days with garden and cotton waste. It is important to note, however, that the aim of these studies was to characterize stabilized or mature compost after the degradation process, whereas the present study was carried out on an SSF as such, with high moisture levels, constant temperatures and lower temperatures.

L-Asparaginase and L-Glutaminase Activity:

The methodology used was based on two procedures: the first was described by Frankenberger and Tabatai (1991a, 1991b) and Keeney and Nelson (1982) for the enzyme-substrate reaction stage; and the second involved the use of "ammonium ion-selective" equipment with a gas membrane, the principle of which is based on the transformation of ammonium ions to ammonia at a pH greater than 11. A fermentation sample of 0.5 g was mixed with 10 mL of Tris buffer pH 10 and 1 mL of substrate (0.5 mol/L asparagine or 0.5 mol/L glutamine). As a control, 0.5 g of fermentate with 9 mL of Tris buffer pH 10 were used together with 1 mL of substrate to which 35 mL of $Ag_2SO_4$—KCl were added before the incubation process. The blank tubes were the same as the samples and the control tubes, but no substrate was added. All samples, with their corresponding blank and control tubes, were incubated for 2 h at 37° C. After incubation and, as with the control, 35 mL of $Ag_2SO_4$—KCl were added to the samples to stop the reaction. The samples were subsequently filtered and the $NH_3$ was distilled via steam distillation and trapped in boric acid (Sadzawka et al., 2005). Once the different samples had been distilled, they were titrated with 0.005 M sulfuric acid ($H_2SO_4$). The amount of sulfuric acid consumed was proportional to the concentration of ammonium and represented the liberation of the product generated by the enzyme.

Figure 5:
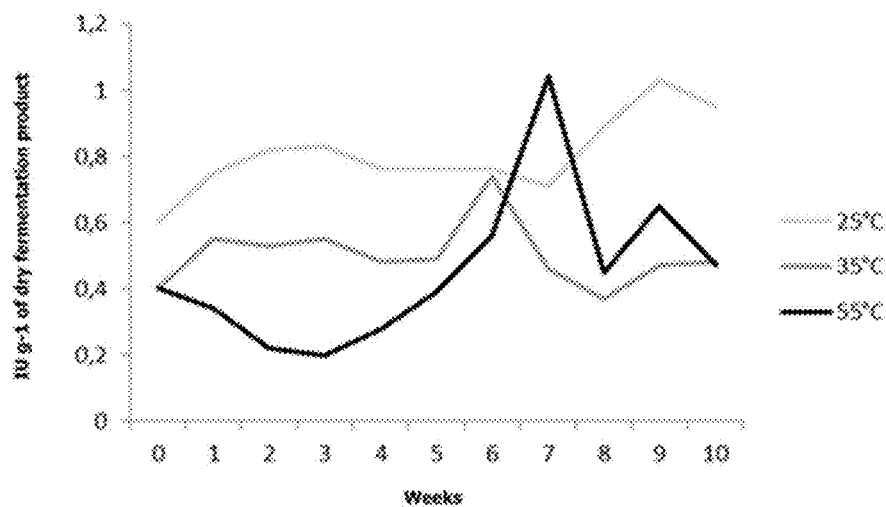

The L-asparaginase activity levels were higher with fermentation at 25° C. and 80% moisture than under the other conditions tested, reaching a value of 1.03 IU $g^{-1}$ of dry fermented matter in week 9 of the trial. In the fermentation trial at 35° C. and 55° C. with 60% moisture, the highest activity levels were recorded in weeks 7 and 6, respectively, with a visible increase in activity of the enzyme at 55° C. starting in week 6, as seen in FIG. 5. The almost non-existent difference between maximum activity levels reached at 25° C. and 55° C. confirms the wide temperature range in which the enzyme functions. This is described by El-Bessoumy et al. (2004), who state that, although L-asparaginase reaches maximum activity levels at 37° C., activity remains at 52% at 50° C.

Figure 6:
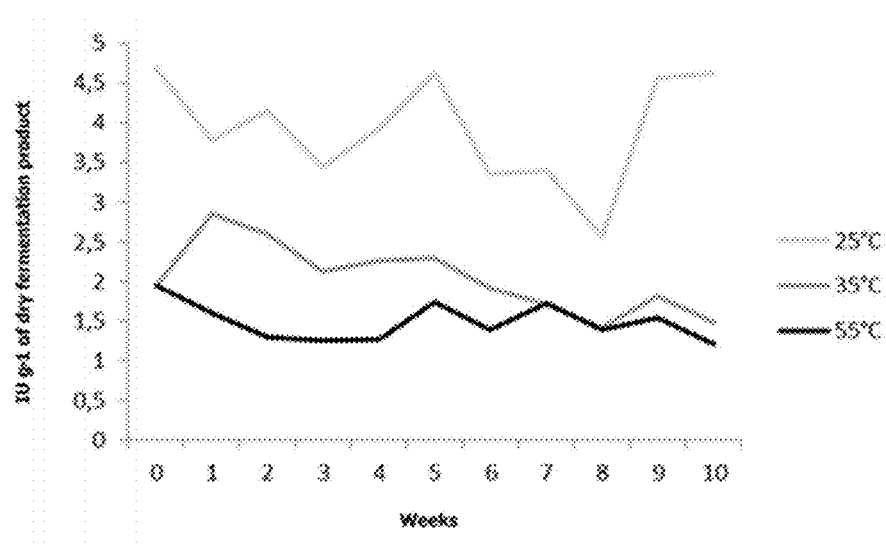

L-glutaminase was significant in reaching the highest activity levels of all enzymes tested. Under fermentation at 25° C., a maximum of 4.6 IU $g^{-1}$ of dry fermented matter was reached in weeks 5 and 10, whereas at 35° C. and 55° C. the highest activity level was reached at 35° C. during the first 5 weeks of fermentation, but with levels lower than those reached at 25° C. (FIG. 6).

These results make it possible to determine optimal fermentation conditions for obtaining a preparation with the correct enzymes to meet the specific requirements of a soil. In the case, for example, of producing a biofertilizer where high activity of the enzyme alkaline phosphatase is desired, the said enzyme can be obtained in 3 weeks of manure fermentation at a temperature of 35° C. and with 60% moisture. On the other hand, if a mixture with high activity of the enzyme L-glutaminase is desired, fermentation must be carried out at 25° C., with 80% moisture and for no more than 5 weeks. It is thus possible to obtain high levels of enzymatic activity from a low-cost and abundant substrate such as manure. In addition, it is not always necessary to treat the manure before fermentation to adjust moisture.

Solid-State Fermentation in Piles:

The piles of bovine manure for enzyme production had a minimum volume of 1 $m^3$. In this case, 2 piles with the dimensions 3 m×2.5 m×1 m (length, height and width, respectively) were used to evaluate 2 different SSF configurations. The first pile was thermally insulated with black polyethylene mesh filled with wheat straw, whereas the second pile was left exposed. Enzymatic activity was measured in samples obtained directly from the piles after SSF, as well as enzymatic activity under storage conditions at ambient temperature and 4° C.

The manure was obtained from dairy cow stalls at the Humán Experimental Station of the Agriculture and Livestock Research Institute (INIA) in the Los Ángeles area in Chile. Approximately 2 t were collected in a roofed area over a period of 3 days and subsequently transported to the El Nogal Experimental Station of the Faculty of Agronomy of the University of Concepción, where the manure was spread out over a polyethylene surface for drying until a moisture level of 60% was reached. Then, two piles with the dimensions 3 m×2.5 m×1 m (length, height and width, respectively) were created, one of which was covered with mesh and straw insulation. The piles were turned 4 times a day to control temperature and watered with the same frequency to maintain a moisture level of 60%. After 9 days, 4 piles were created from the 2 initial piles in order to carry out the SSF. After 30 days of SSF the matter was placed in sacks (Table 3).

TABLE 3

Sampling during SSF.

| Description | Days After SSF Start |
| --- | --- |
| First sampling to measure enzymatic activity from SSF piles | 40 |
| Storage in sacks at 4° C. and ambient temperature | 58 |
| Second sampling to measure enzymatic activity from stored sacks | 58 |

Figure 7:
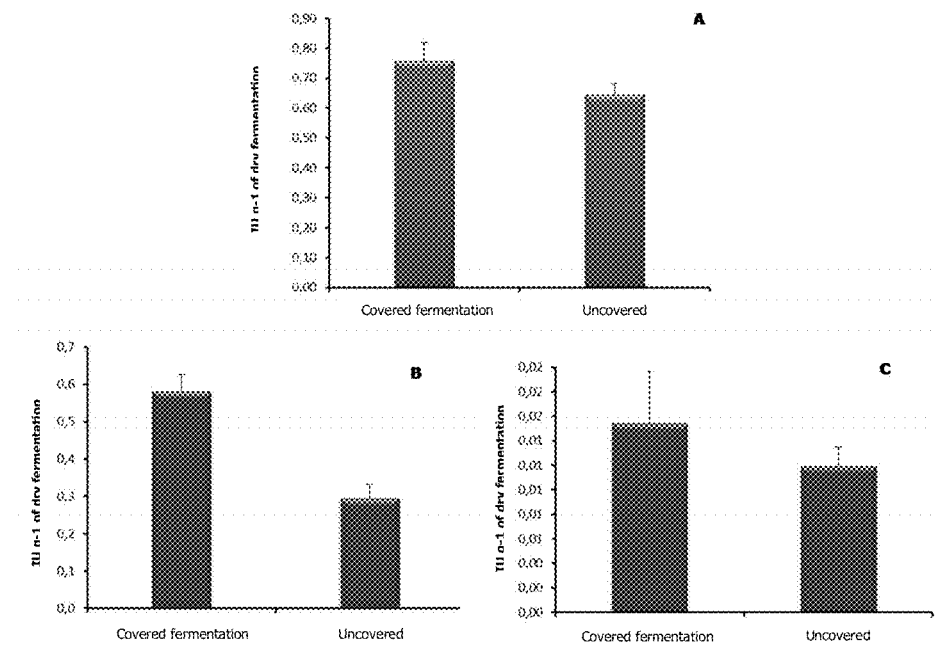
Figure 8:
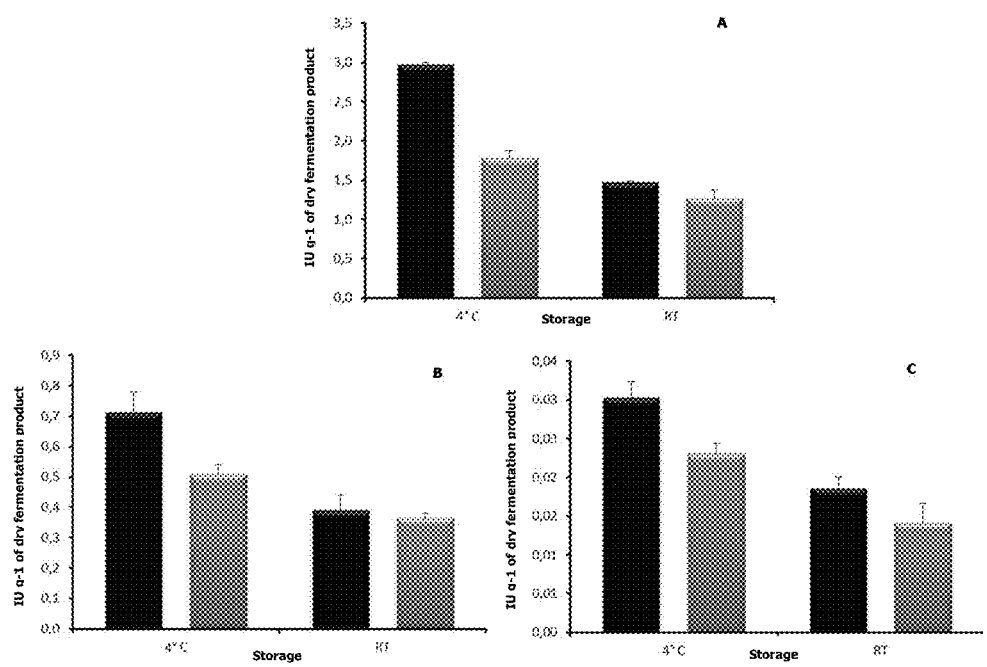
Figure 9:
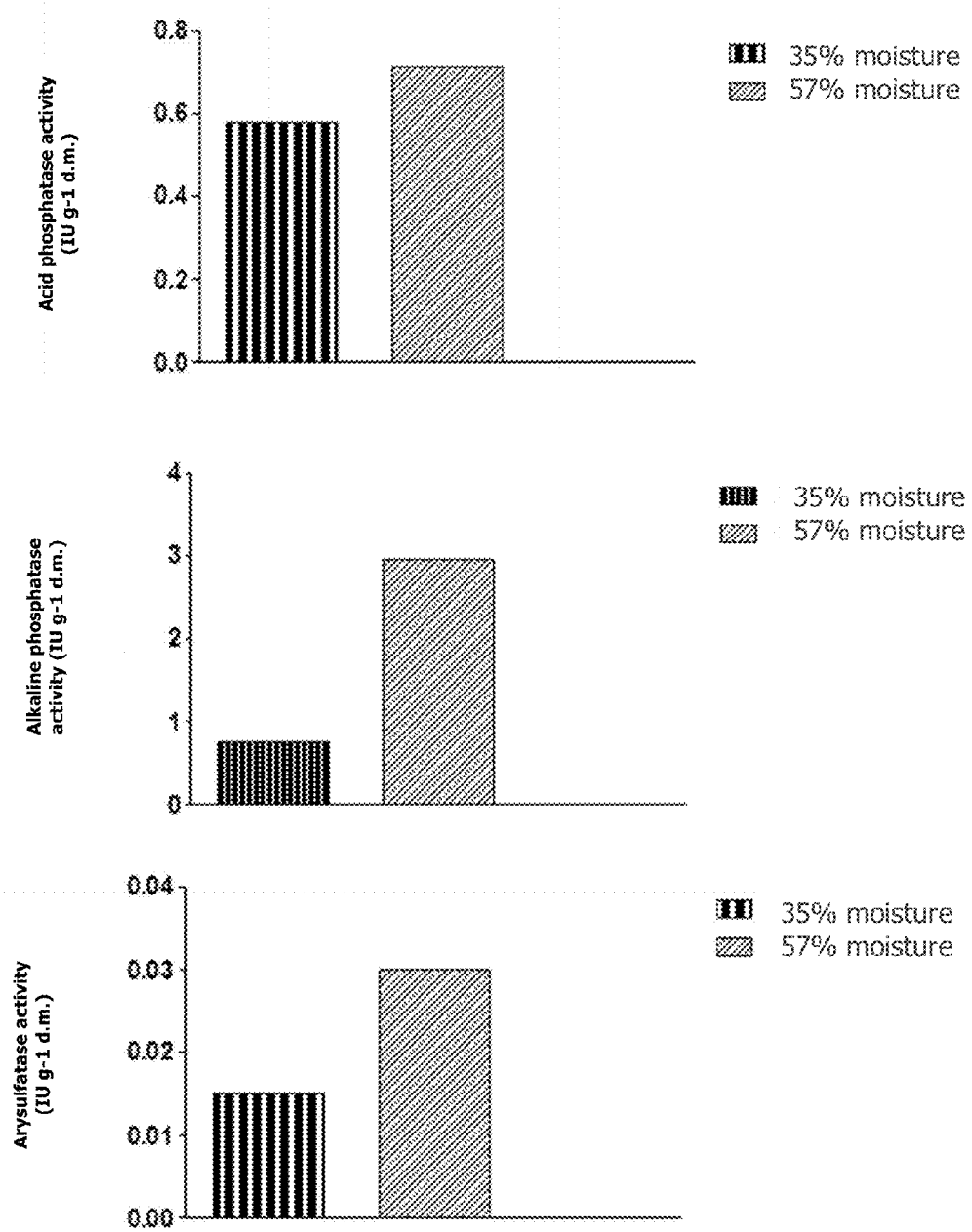

FIG. 7 shows the activity of the different enzymes: alkaline phosphatase (a), acid phosphatase (b), and arylsulfatase (c) after solid-state fermentation under an insulating cover compared with enzymatic activity in a fermentation pile without insulation. It is possible to observe a tendency towards higher activity in the covered pile in this case. FIG. 8 shows the activity levels of the different enzymes: alkaline phosphatase (a), acid phosphatase (b), and arylsulfatase (c) from the insulated pile (black) and from the exposed pile (gray) after being stored for 37 days. The storage conditions are: 1) in sacks at 4° C., and 2) in sacks at ambient temperature. The results show that the fermentate from the insulated pile stored at 4° C. had significantly higher activity levels than the other samples. Stored in a warehouse, enzymatic activity decreases mainly due to the loss of moisture of the fermented matter. However, this process can be reverted by adding water to the product, as seen in FIG. 9.

II. Addition of Allophane to a Manure Fermentate to Obtain a Biofertilizer

The allophane used for this study consisted of spherules with a diameter of 5 nm.

The aim of this trial was to optimize the enzyme immobilization process with allophane by determining the correct allophane/manure proportion for the highest level of enzymatic activity, as well as the ideal moment for adding the allophane and immobilizing the enzymes.

The manure used was collected from calf fattening stalls and stored in a barn for at least 1 month. Subsequently, the manure was dried and treated by wetting it and shredding it with a chipping machine, after which it was stored at ambient temperature for 2 weeks. Before the trial began, the moisture level of the manure was brought up to 60%.

The trial consisted of 2 treatments and 3 replicates for each one. All treatments were fermented for 16 days at 35° C. and with 65% moisture, except for treatment 1, corresponding to the unfermented manure. To carry out fermentation, an incubation chamber with controlled conditions was used. Allophane was added to each experimental unit in a proportion of 15% to 30% of dry matter at the end of the fermentation process (after 16 days). Unfermented manure without allophane was used as a control.

Table 4 shows the conditions analyzed, where the allophane content corresponds to 11% on a wet basis. It is important to note that the enzymatic concentration is different for each of the three manure mixtures, as the enzymes come from the manure itself.

TABLE 4

Experimental conditions for the trial.

| Allophane/manure proportion | Addition of allophane (days) | Manure (dry solid in grams) | Allophane (dry solid in grams) |
|---|---|---|---|
| 0/100 | Manure | 525 | 0 |
|  | Control | 525 | 0 |
| 15/85 | 16 | 446.25 | 78.75 |
| 30/70 | 16 | 367.5 | 157.5 |

Figure 10:
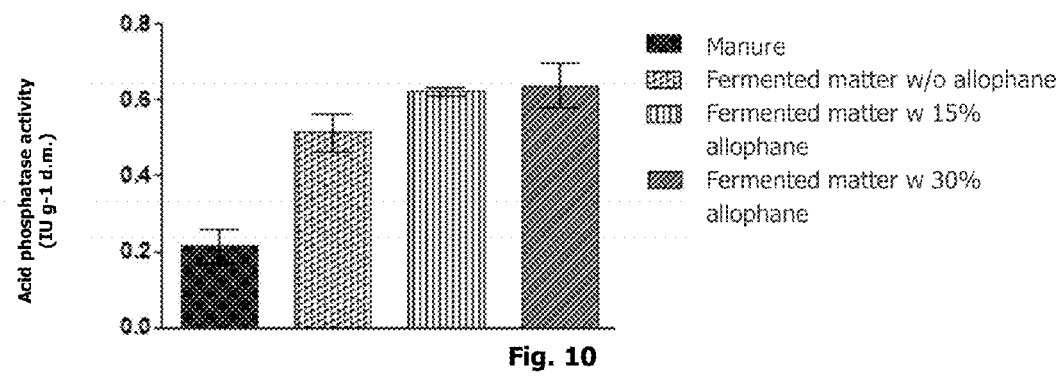

The enzymatic activity of the fermentates with 15% and 30% allophane was analyzed and compared with the activity in the manure and fermentate without allophane. The activity of the different enzymes was tested in the fermented matter obtained, to which two different proportions of allophane were added. In summary, enzymatic activity was measured in unfermented manure (F), fermented manure without allophane (s/A), and in the fermented manure with allophane added after 16 days, at the end of the SSF process. According to the results in FIG. 10, where the acid phosphatase activity levels are shown, there were no significant differences between the 15/85 and 30/70 allophane/fermentate mixtures. From a financial point of view, it is therefore advisable to work with a proportion of 15% allophane to 85% of fermented matter.

III. Second Solid-State Fermentation for Maturing the Fermentate.

The second solid-state fermentation is carried out to reduce the number of pathogens and obtain a biofertilizer that is innocuous to plants and safe to use. As shown in Table 4, this process enables a significant reduction of $E.\ coli$ levels in the fermented matter.

In order to determine the amount of pathogens present at the different stages of the biofertilizer production process, samples were taken throughout the process, as described below:
 a) Bovine manure fermentate, fermented for 17 days at 35° C. and with 65% moisture in a reactor. Sample taken from stage 1.
 b) Bovine manure fermentate, fermented in an exposed pile for 90 days. Sample taken from stage 1.
 c) Mature fermentate from pile SSF. Sample taken from stage 3 of the process.

$Salmonella$ sp. levels were determined using the most-probable-number method. Thus, 100 g, 10 g and 1 g samples were taken from the different fermentate samples using sterile bags and enriched with lactose broth, homogenized with a Stomacher and incubated for 24 h at 35° C. The mixtures were then transferred to a Rappaport-Vassiliadis selective medium for $Salmonella$ spp. and incubated for 24 h at 35° C. Tubes with any degree of turbidity were transferred to SS Agar dishes and incubated again for 24 h at 35° C. Suspected $Salmonella$ colonies (non-lactose fermenting, $H_2S$ producing) were verified using the Remel RapID ONE System.

For the $E.\ coli$ count, 25 g samples of each fermentate type were prepared, added to 225 mL of diluent and homogenized in a Stomacher. For culturing, different dilutions of the preparation were inoculated in ChromoCult Coliform Agar ES. Suspected colonies were then confirmed using biochemical tests (TSI, LIA, MIO, urea and citrate).

The results of the counts are shown in Table 5, where it can be seen that the $E.\ coli$ levels decreased in fermentate c.

TABLE 5

Pathogenic bacteria count.

| STAGE | $Salmonella$ count (MPN g-1) | $E.\ coli$ count (CFU g-1) |
|---|---|---|
| Fermentate a | <0.3 | 6160000 |
| Fermentate b | <0.3 | 143000000 |
| Fermentate c | <3 | 210 |

Example 2: Effect of the Biofertilizer on a Perennial Ryegrass (*Lolium perenne* L.) Crop The effects of the biofertilizer formulation on the yield of *Lolium perenne* L. (perennial ryegrass) were evaluated with regard to germination percentage, height of the young plants and dry matter yield.

Figure 11:
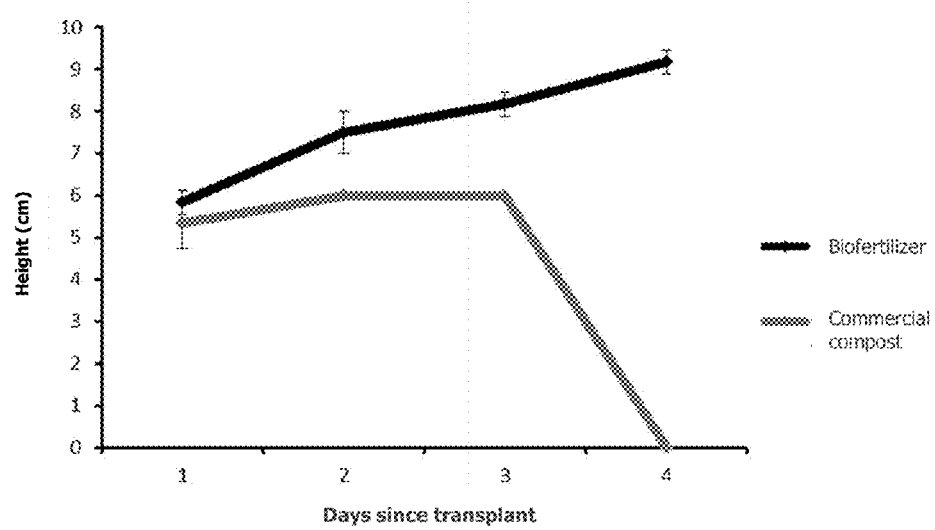

Germination Test:

As a first step, a trial was carried out to evaluate the effects of the biofertilizer on 7-day-old perennial ryegrass seedlings. Perennial ryegrass seeds were pre-germinated and transplanted after 7 days to pots containing the biofertilizer and control pots containing commercial compost (Vita Frut produced by Rosario S. A.). The plants were watered with distilled water and no additional fertilizers were added. Plant development was recorded for 1 week. The results in FIG. 11 show that the plants that were transplanted to commercial compost presented higher mortality rates and lower development levels compared to the plants treated with the new biofertilizer.

Figure 12:
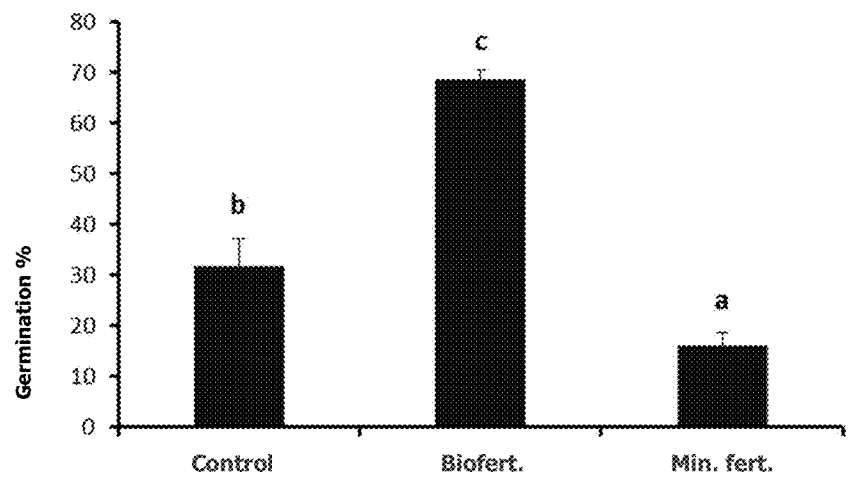

For step 2, the germination percentage of plants grown in a soil to which the biofertilizer had been added was measured and compared with the results obtained from germinating the perennial ryegrass seeds in an untreated soil with low nutrient content (control soil, Table 6), and a soil that was fertilized traditionally with a mineral product. As seen in FIG. 12, the germination percentage was higher when using the biofertilizer, whereas the soil that was fertilized traditionally had a lower germination percentage than the control soil (possibly indicating a degree of sensitivity on the part of the seed to mineral fertilizers). Different letters indicate significant differences in the averages of each treatment (t-test, $p<0.05$).

TABLE 6

Chemical characterization of the control soil.

| N—NO$_3$ ppm | N—NH$_4$ ppm | S ppm | P ppm | OM % | pH* | EC dS/m |
|---|---|---|---|---|---|---|
| 1.12 | 3.08 | 2.42 MB | 6 B | 2.66 | 5.88 | 0.037 S/R |

Plant Development Trial:

The bovine manure fermentate used was prepared in a controlled process lasting 2 weeks at 35° C. and with 60% wet basis moisture.

The trial was carried out in an incubation chamber under the following conditions: photoperiod of 16 hours of light, with a temperature of 22° C. during the day and 15.5° C. at night.

Pots with a diameter of 15 cm were used as experimental units. These were filled with 1.5 kg of low-nutrient soil (Table 6), which was sieved to 2 mm. To each experimental unit, a dose equivalent to 7 t ha$^{-1}$ of either biofertilizer or inorganic fertilizer with nutrient concentrations identical to the biofertilizer was added. There was also a control to which no fertilizer was added. In the case of the inorganic fertilizer, N was applied as urea, P as triple super phosphate, and K as potassium chloride. Table 7 presents the treatments and their composition. 120 seeds of *Lolium perenne* L. ('Grasslands Nui') were sown in each experimental unit. Once the seedlings emerged, the units were thinned in order to leave 100 seedlings per unit. The experimental design was random blocks with 3 replicates.

TABLE 7

Composition of each fertilizer treatment.

| Treatment | Nutrient dose | Fertilization |
|---|---|---|
| Control | 0 | — |
| Biofertilizer | 56.317 kg N/ha | 7 t biofertilizer/ha |
| | 54.6 kg P/ha | |
| | 84 kg K/ha | |
| Inorganic fertilizer | 56.317 kg N/ha | 122.428 kg urea/ha |
| | 54.6 kg P/ha | 271.813 kg TSP/ha |
| | 84 kg K/ha | 168 kg KCl/ha |

Figure 13:
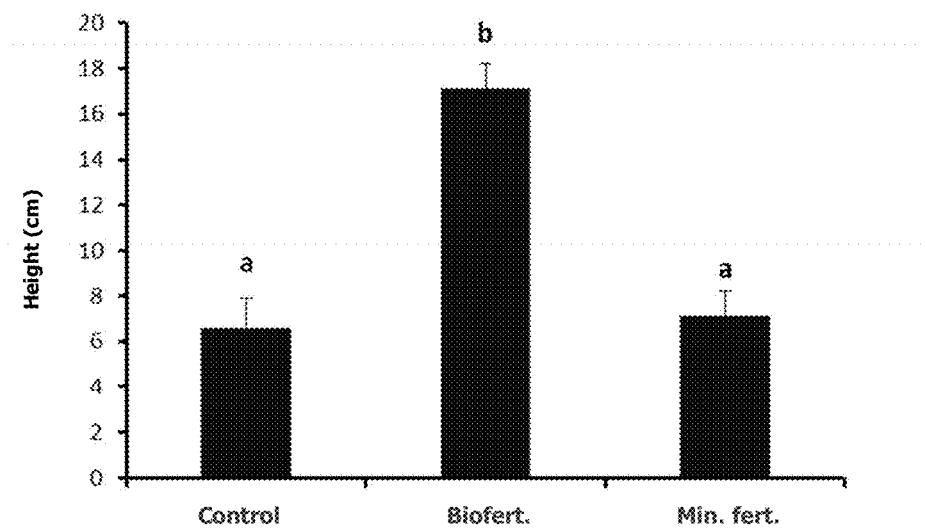

15 days after the seeds had germinated, the height of the plants was measured. As seen in FIG. 13, the plants treated with the biofertilizer were taller than those of the control and inorganic fertilizer treatments. In addition, and contrary to expectations, the plants treated with the mineral fertilizer were not significantly different from those of the control.

Figure 14:
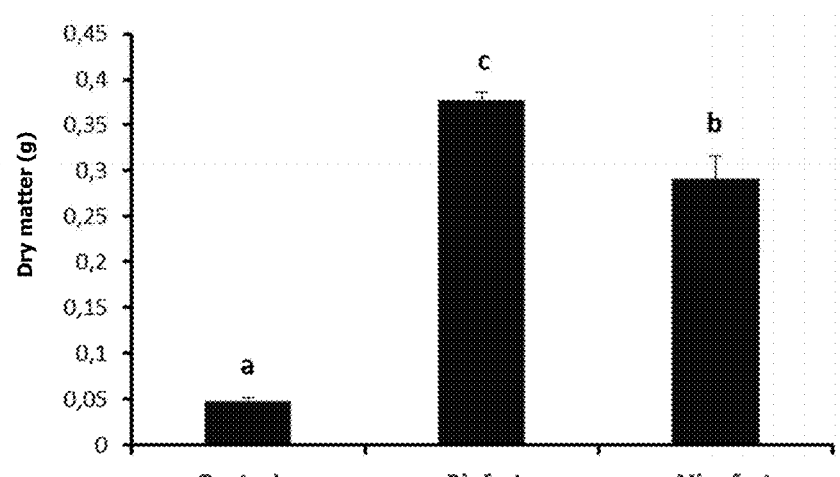

After two months of growth, the yield in dry matter was measured for each treatment. According to the results, the plants treated with the biofertilizer gave a higher yield of dry matter compared to the control and mineral fertilizer treatments (FIG. 14).

The invention claimed is:

1. Process for producing a biofertilizer comprising the following stages:
    a) subjecting an agricultural, livestock and agro-industrial waste to a first solid-state fermentation (SSF) for producing organic substrates, microorganisms and enzymes selected from the group consisting of phosphatases, sulfatases, asparaginases and glutaminases;
    b) immobilizing the enzymes and substrates produced during stage a) by adding allophane nanoparticles, wherein the allophane nanoparticles are spherules having a diameter of 3-8 nm that form porous aggregates, to obtain an intermediate product, and protecting the enzymes and organic substrates from microbial degradation by the microorganisms; and
    c) subjecting the intermediate product obtained from stage b) to a second solid-state fermentation (SFF) to reduce the number of pathogenic microorganisms thereby improving the quality of the obtained biofertilizer which is innocuous to plants.

2. Process for producing a biofertilizer according to claim 1, wherein stage a) of the process is carried out in reactors or piles.

3. Process for producing a biofertilizer according to claim 1, wherein stage a) is carried out at a temperature of between 25° C. and 70° C., with a moisture level of between 55% and 80%, and lasts between 12 and 18 days when carried out in reactors and between 5 and 10 weeks when carried out in piles.

4. Process for producing a biofertilizer according to claim 1, wherein in stage b) allophane is added in a proportion of between 10% and 40% weight/weight with regard to a dry fermented matter.

5. Process for producing a biofertilizer according to claim 1, wherein the SSF stage c) lasts between 30 and 60 days and is carried out at a temperature of between 15° C. and 50° C., with a moisture level of between 60% and 85%.

6. The process for producing a biofertilizer according to claim 1, wherein the obtained biofertilizer has a concentration of encapsulated enzymes in the allophane comprising 1.09-4.4 IU/g of alkaline phosphatase, 0.2-1.2 IS/g of acid phosphatase, 0.05-0.1 IU/g of arylsulfatase, 0.6-1.05 IU/g of L-asparaginase, and 3.0-4.6 IU/g of L-glutaminase.

* * * * *